US007889414B2

(12) United States Patent
Ikeda

(10) Patent No.: US 7,889,414 B2
(45) Date of Patent: Feb. 15, 2011

(54) REFLECTION TYPE DISPLAY APPARATUS

(75) Inventor: Hajime Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 12/168,517

(22) Filed: Jul. 7, 2008

(65) Prior Publication Data

US 2009/0021822 A1 Jan. 22, 2009

(30) Foreign Application Priority Data

Jul. 18, 2007 (JP) ............................. 2007-187106

(51) Int. Cl.
*G02F 1/153* (2006.01)
(52) U.S. Cl. ........................ 359/267; 359/265; 359/269; 359/272
(58) Field of Classification Search .................. 359/267
See application file for complete search history.

(56) References Cited

U.S. PATENT DOCUMENTS

| 5,452,113 | A | 9/1995 | Ikeno | 359/53 |
| 5,831,760 | A | 11/1998 | Hashimoto et al. | 359/273 |
| 7,190,417 | B2 * | 3/2007 | Harada et al. | 349/25 |
| 2006/0061530 | A1 * | 3/2006 | Yuasa | 345/88 |

FOREIGN PATENT DOCUMENTS

JP 11-101994 4/1999

OTHER PUBLICATIONS

"AIST Today 2003", vol. 3, No. 3, pp. 4-6, published by Advanced Industrial Science and Technology (2003) (English translation only, pp. 1-10).

* cited by examiner

*Primary Examiner*—Jessica T Stultz
(74) *Attorney, Agent, or Firm*—Fitzpatrick, Cella, Harper & Scinto

(57) ABSTRACT

A reflection type display apparatus includes a first light modulating layer for controlling electrically and externally a light absorbing state and a light transmitting state, a second light modulating layer for controlling electrically and externally a light reflecting state and the light transmitting state, and a reflector for reflecting light of a particular wavelength band. The first and second light modulating layers and the reflector are arranged in order from a light incidence side. The first light modulating layer includes a first electrode of a light transmitting property arranged at the light incidence side, and a first counter electrode disposed in opposition to the first electrode sandwiching a first electrolytic solution containing a first metal ion between the first electrode and the first counter electrode, for controlling the light absorbing state and the light transmitting state according to depositing of the first metal ion onto the first electrode and according to dissolving of the first metal ion into the first electrolytic solution.

8 Claims, 6 Drawing Sheets

SCATTERING SHEET 22

CONCAVE & CONVEX PATTERN 6a

REFLECTION TYPE DISPLAY APPARATUS

BACKGROUND OF THE INVENTION

1. Field of the Invention

The present invention relates to a reflection type display apparatus used for an electronic device such as electronic paper.

2. Description of the Related Art

As a display apparatus that provides good visual recognition and consumes a small amount of power, electronic paper is under active development. As an example of display apparatuses used for electronic paper, an electrochromic display (ECD), which uses a reversible chromatic change caused in a solid or liquid arranged between electrodes by means of voltage application, is known. Also, an electro-deposition type display, which uses deposition/dissolution of metal ions solved out in an electrolyte arranged between electrodes by mean of an electrochemical reaction to display black/white, is known. For example, where electroplating of transparent electrodes is used, it is considered that the display apparatus provides a bright display of highly efficient in the use of light.

Japanese Patent Application Laid-Open No. H11-101994 discloses an example of incorporating color filters in such an electroplating-used display apparatus as mentioned above. The display apparatus disclosed in Japanese Patent Application Laid-Open No. H11-101994 has a silver salt solution arranged between a transparent electrode and a counter electrode, and a porous white background plate with numerous minute holes arranged between the transparent electrode and the counter electrode, and operates to determine the light transmitting state with the transparent electrode, and the reflecting state with the white background plate. Japanese Patent Application Laid-Open No. H11-101994 states that this display apparatus has a micro color filter arranged in each unit cell to display a color image and gradation expression can be realized by controlling the voltage that drives each unit cell, thereby easily providing full color display.

Also, U.S. Pat. No. 5,452,113 discloses a reflection type color display apparatus with an enhanced reflectance for white display. The reflection type display apparatus disclosed in U.S. Pat. No. 5,452,113 has a first dimmer layer in which light scattering and transmitting states can be controlled by an external electric field, and a second dimmer layer in which light scattering and transmitting states can be controlled by an external electric field provided in this order from the light entering side. U.S. Pat. No. 5,452,113 states that for the second dimmer layer, a guest host-type liquid crystal element obtained by mixing and dispersing a dichroic pigment in a liquid crystal may be used.

SUMMARY OF THE INVENTION

However, the display apparatus disclosed in Japanese Patent Application Laid-Open No. H11-101994 has a structure in which incident light passes through a color filter before being reflected by a reflective layer. In order to display white with this structure, pixels for three primary colors are required. Each pixel reflects a single color only, and the color components in the incident light that are not reflected are absorbed by the color filters of the respective pixels. For example, in a pixel that reflects red, the blue and green components are absorbed, in a pixel that reflects blue, the red and green components are absorbed, and in a pixel that reflects green, the blue and red components are absorbed. Accordingly, when white is displayed, the red components are absorbed in the blue and green pixels, and the blue components are absorbed in the red and green pixels, and the green components are absorbed in the red and blue pixels. In other words, the area that reflects red is one third of the area of the display apparatus. This applies to the areas that reflect green and blue, too. As stated above, each color is reflected only at one third of the area, resulting in the overall reflectance being only one third when white is displayed simply based on the effective reflection area factors of the respective colors, and thus, the reflectance is insufficient.

Also, in the structure disclosed in U.S. Pat. No. 5,452,113, when black is displayed, incident light needs to pass through the first dimmer layer before entering the second dimmer layer. Accordingly, the interfacial reflection at multiple interfaces cannot be ignored, resulting in difficulty to provide good black display.

An object of the present invention is to provide a reflection type display apparatus that has reduced unwanted reflection when black is displayed, has a high reflectance when white is displayed, and can provide color display.

In order to achieve the above object, a reflection type display apparatus according to the present invention includes: a first light modulating layer for controlling electrically and externally a light absorbing state and a light transmitting state; a second light modulating layer for controlling electrically and externally a light reflecting state and the light transmitting state; and a reflector for reflecting light of a particular wavelength band, wherein the first and second light modulating layers and the reflector are arranged in this order from a light incidence side.

According to the present invention, it is possible to provide a reflection type display apparatus that has reduced unwanted reflection when black is displayed, has a high reflectance when white is displayed and can provide color display.

Further features of the present invention will become apparent from the following description of exemplary embodiments with reference to the attached drawings.

DESCRIPTION OF THE EMBODIMENTS

Figure 1:
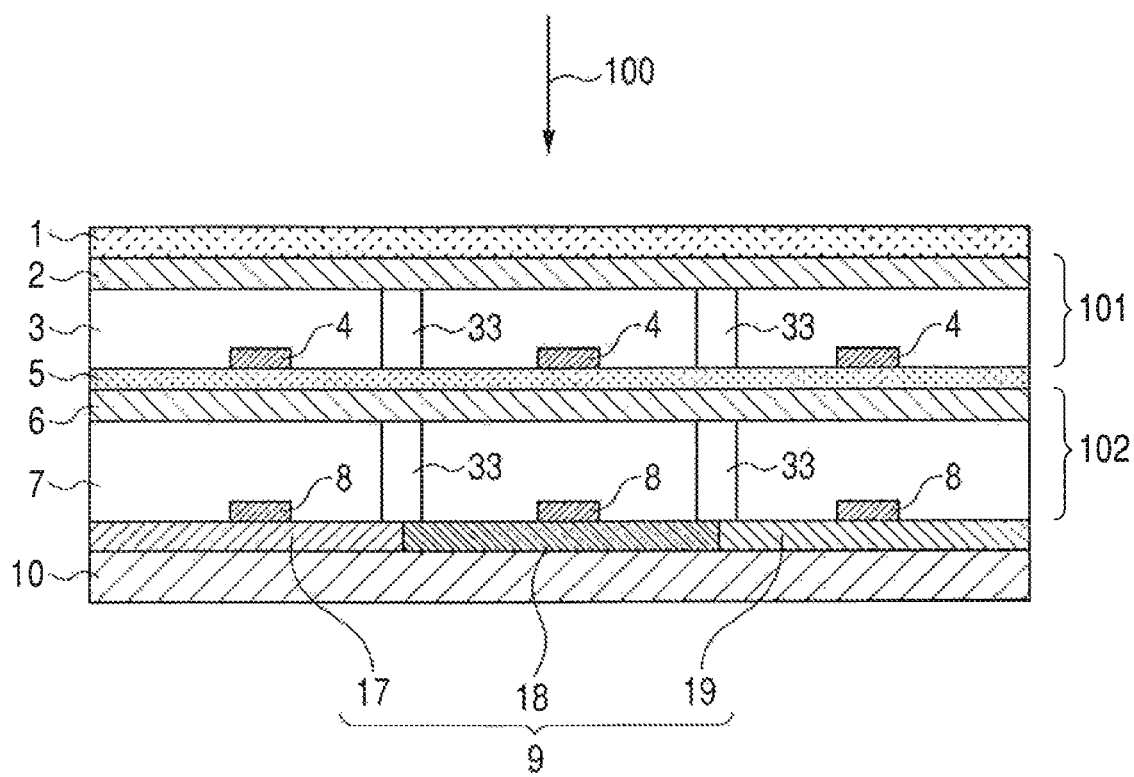
FIG. 1 is a cross-sectional view of a configuration of a reflection type display apparatus according to an embodiment of the present invention.
Figure 2:
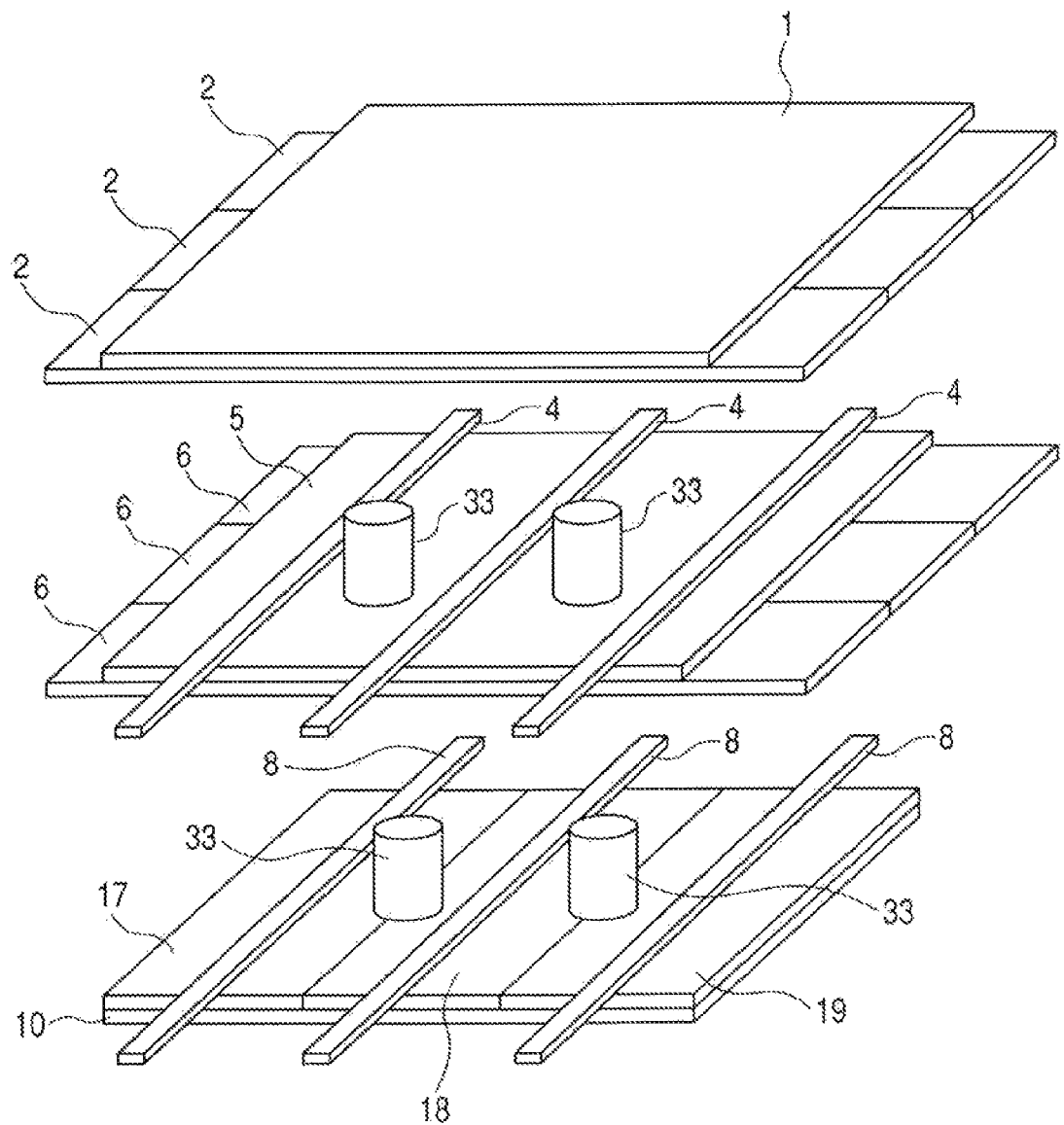
FIG. 2 is a perspective view of the configuration of the reflection type display apparatus illustrated in FIG. 1.

Hereinafter, an embodiment of the present invention will be described with reference to the drawings. A reflection type display apparatus according to the present embodiment includes a first light modulating layer, a second light modulating layer, and a reflector that reflects light in a particular wavelength band in this order from the light incidence side. The first light modulating layer is configured to allow a light absorbing state and a light transmitting state to be controlled externally and electrically. Other than the method using electroplating, an electrochromic layer or the like can be used for the first light modulating layer. The second light modulating layer is configured to allow a light reflecting state and the light transmitting state to be controlled externally and electrically, and a method such as a method using electroplating with a bright substance such as sliver deposited or a method that switches between reflection and transmission by means of an electrochromic layer can be used for the second light modulating layer. An example of the specific configuration of the apparatus where transparent electrode electroplating is used to control the first and second light modulating layers will be described in details with reference to FIG. 1. FIG. 1 is a cross-sectional view of a configuration of a reflection type display apparatus according to an embodiment of the present invention. Also, FIG. 2 is a perspective view of the configuration of the reflection type display apparatus illustrated in FIG. 1. However, the configuration of an apparatus according to the present invention is not limited to this embodiment, and a configuration using, for example, an electrochromic layer, which is described later, may be employed. In the apparatus configuration in FIG. 1, pixels (cells) for three colors, i.e., red, blue and green, are illustrated.

The reflection type display apparatus illustrated in FIG. 1 can provide color display, and includes a first light modulating layer 101, a second light modulating layer 102 and a color reflector (hereinafter, referred to as "reflector") 9 that reflects light in a particular wavelength band, in this order from the side from which light 100 enters.

The first light modulating layer 101 includes a transparent first electrode 2 in which a light absorbing substance is deposited to form light absorbing electroplating, and first counter electrodes 4 facing the first electrode 2 across a first electrolytic solution (electrolytic layer) 3. On the first light modulating layer 101, a transparent first supporting substrate 1 that protects the front surface is arranged. Below the first light modulating layer 101, a second supporting substrate 5, which is arranged between the first light modulating layer 101 and the second light modulating layer 102, is provided.

The second light modulating layer 102 includes a transparent second electrode 6 in which a light reflecting substance is deposited to form light reflecting electroplating, and second counter electrodes 8 facing the second electrode 6 across a second electrolytic solution (electrolytic layer) 7.

The reflector 9 is arranged below the second light modulating layer 102, in other words, on the side of the second light modulating layer 102 opposite the side from which the light 100 enters. The reflector 9 includes first reflectors 17 that reflect light in a wavelength band for red, second reflectors 18 that reflect light in a wavelength band for green, and third reflectors 19 that reflect light in a wavelength band for blue. Below the reflector 9, a third supporting substrate 10 is arranged.

The first and second electrolytic solutions 3 and 7 each contain metal ions. The first and second counter electrodes 4 and 8 are transparent, or where not transparent, have a structure that has a small area occupied in the pixels not to hinder visual recognition of the lower layers. More specifically, the structure where the first and second counter electrodes 4 and 8 are not transparent has the shape of thin lines, stripes, networks, combs or the like, but is not necessarily limited to the aforementioned shapes. FIGS. 3A to 3D are schematic diagrams each illustrating an example arrangement where the device is viewed from the front surface side. In these figures, each red pixel 26 corresponds to a first reflector 17, each blue pixel 27 corresponds to a third reflector 19, each green pixel 28 corresponds to a second reflector 18, and electrodes 29 correspond to the first and second counter electrodes 4 and 8.

Figure 3A:
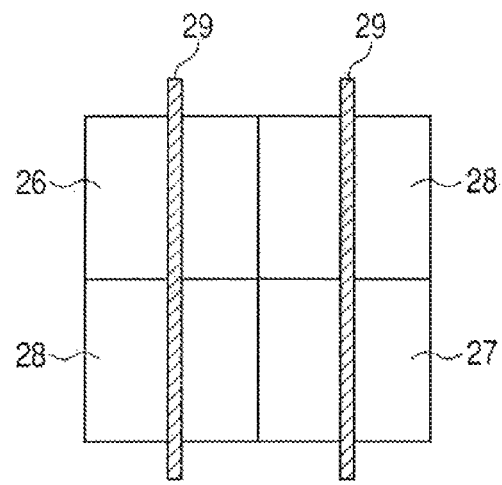
FIG. 3A is a diagram illustrating an example arrangement of first and second counter electrodes.
Figure 3B:
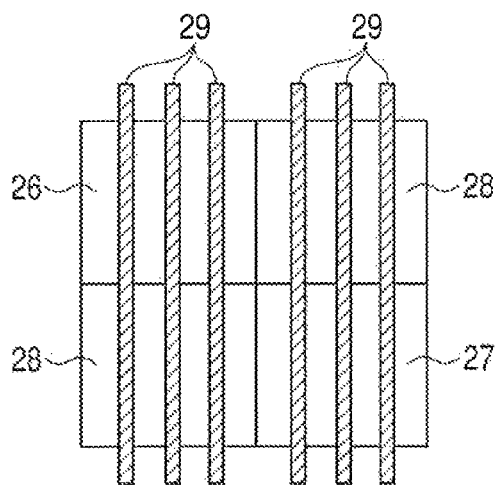
FIG. 3B is a diagram illustrating an example arrangement of first and second counter electrodes.
Figure 3C:
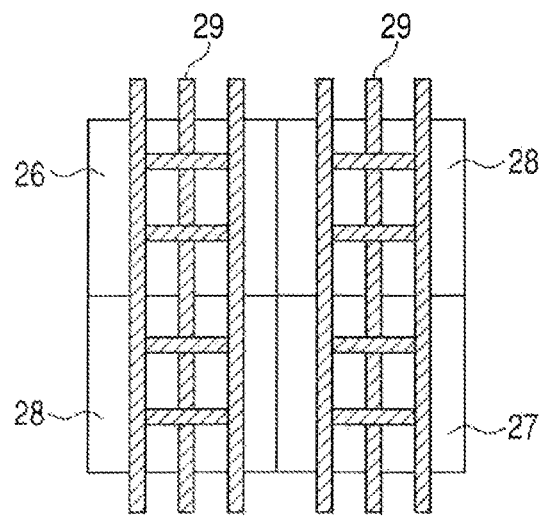
FIG. 3C is a diagram illustrating an example arrangement of first and second counter electrodes.
Figure 3D:
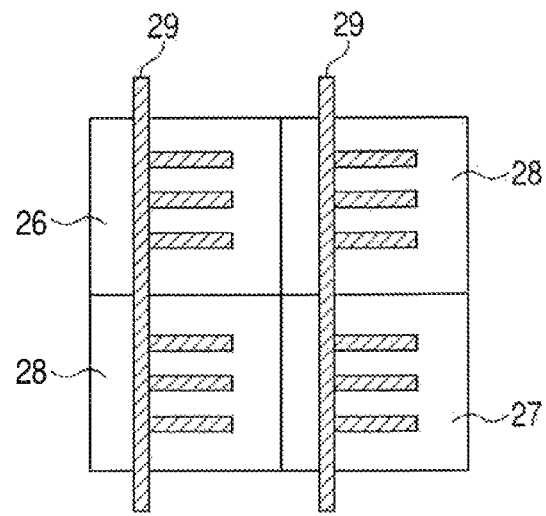
FIG. 3D is a diagram illustrating an example arrangement of first and second counter electrodes.

FIG. 3A indicates the case where the electrodes 29 are arranged in the shape of thin lines in the red, blue and green pixels 26 to 28, and FIG. 3B indicates the case where the electrodes 29 are arranged in the shape of stripes in the red, blue and green pixels 26 to 28. Also, FIG. 3C indicates the case where the electrodes 29 are arranged in the shape of networks in the red, blue and green pixels 26 to 28, and FIG. 3D indicates the case where the electrodes 29 are arranged in the shape of combs in the red, blue and green pixels 26 to 28. Although FIGS. 3A to 3D illustrate that the red, blue and green pixels 26 to 28 are arranged in the Bayer pattern, it should be understood that another arrangement may be employed.

Where the first and second counter electrodes 4 and 8 are not transparent, it is favorable that they are arranged in the same or similar manner. In that case, the first and second counter electrodes 4 and 8 do not transmit light, lowering the transmittance, and accordingly, it is favorable for the first and second counter electrodes 4 and 8 to have an area that is as small as possible. In practical use, it is favorable that the areas of the first and second counter electrodes 4 and 8 are less than 60% relative to those of the first and second electrodes 2 and 6. Meanwhile, the first and second counter electrodes 4 and 8 need to be thick enough not to generate excessive heat when current necessary for display is applied, and the thickness may be selected within the range in which the temperatures of the electrodes do not exceed the boiling points of the solvents.

The distances between the first, second and third supporting substrates 1, 5 and 10, as illustrated in FIGS. 1 and 2, are kept constant by spacers 33. Each spacer 33 can be formed in an arbitrary shape including a cylinder, a sphere and a quadrangular prism.

Next, the external and electric control of the light absorbing state and the light transmitting state at the first light modulating layer 101 will be described below.

In the aforementioned configuration, when current is applied between the first electrode 2 and the first counter electrodes 4, using the first electrode 2 as a cathode and the first counter electrodes 4 as anodes, metal ions contained in the first electrolytic solution 3 are reduced and deposited. As a result, the surface of the first electrode 2 is electroplated. For the electroplating of the first light modulating layer 101, a material that absorbs light, i.e., is of black, is used. For the "light absorbing electroplating" for the first light modulating layer 101, for example, an alloy of nickel and zinc can be used. Also, since the thickness of the electroplating of the first light modulating layer 101 is proportional to the product of the current and the current application time, and the light absorbance provided by the electroplating is proportional to the film thickness, the absorbance can be controlled by the current and the current application time. When the direction of the current is reversed, the electroplating of the first light modulating layer 101 is oxidized and dissolved into the first electrolytic solution 3.

Next, the external and electric control of the light reflecting state and the light transmitting state at the second light modulating layer 102 will be described below.

In the aforementioned configuration, when current is applied between the second electrode 6 and the second counter electrodes 8, metal ions contained in the second electrolytic solution 7 are reduced and deposited. As a result, the surface of the second electrode 6 is electroplated. For the electroplating of the second light modulating layer 102, a material that reflects light, i.e., a mirror surface material or a light scattering material is used. For the "light reflecting electroplating" for the second light modulating layer 102, for example, zinc or silver can be used. Since the thickness of the electroplating of the second light modulating layer 102 can be controlled by the current and the current application time and the reflectance is proportional to the film thickness, the reflectance can be controlled by the current and the current application time. As with the electroplating of the first light modulating layer 101, when the direction of the current is reversed, the electroplating of the second light modulating layer 102 is also oxidized and dissolved into the second electrolytic solution 7.

The first light modulating layer 101 is arranged on the front side of the second light modulating layer 102, in other words, on the light incidence side of the second light modulating layer 102. Consequently, when black is displayed, reflection at multiple interfaces in the second light modulating layer 102 before light reaches and is absorbed by the light absorbing electroplating of the first light modulating layer 101 is prevented, enabling to provide good black display.

Next, the principle of display in the reflection type display apparatus according to the present embodiment will be described with reference to FIGS. 4 and 5.

Figure 4:
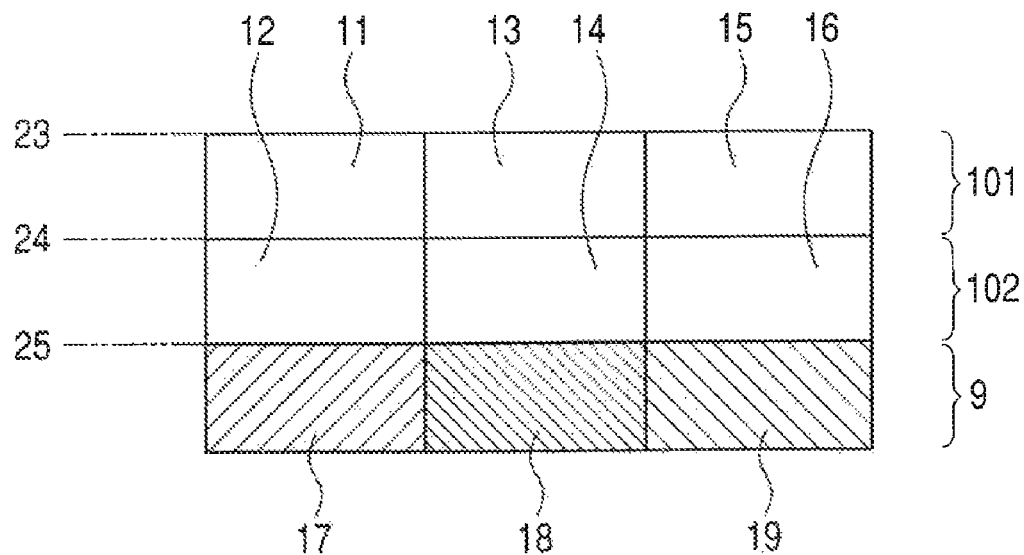
FIG. 4 is a schematic diagram illustrating the principle of display in a reflection type display apparatus according to an embodiment of the present invention.

FIG. 4 is a schematic cross-sectional view of a reflection type display apparatus that provides color display by means of cells of three colors, i.e., red, green and blue. In the figure, the reflectors 17, 18 and 19 correspond to the reflector 9 that reflects light in red, green and blue wavelength bands. Light modulating layers 11, 13 and 15 correspond to the first light modulating layer 101 that controls the light absorptance in the range of 0 to 100%. Light modulating layers 12, 14 and 16 correspond to the second light modulating layer 102 that controls the light reflectance in the range of 0 to 100%. Interfaces 23, 24 and 25 are the surface of the first light modulating layer 101, the interface between the first light modulating layer 101 and the second light modulating layer 102, and the interface between the second light modulating layer 102 and the reflector 9, respectively.

Here, where $T_1$ is the transmittance of the first light modulating layer 101, $R_1$ is the reflectance of the first light modulating layer 101, and $A_1$ is the absorptance of the first light modulating layer 101, and $T_2$, $R_2$ and $A_2$ are the transmittance, the reflectance and the absorptance of the second light modulating layer 102, respectively, Formulae 1 and 2 below can be obtained:

$$T_1 = 1 - A_1 - R_1 \quad \text{(Formula 1); and}$$

$$T_2 = 1 - A_2 - R_2 \quad \text{(Formula 2).}$$

In this case, since $R_1$ is approximately 0 and $A_2$ is approximately 0, Formulae 1 and 2 can be approximated by Formulae 3 and 4 below:

$$T_1 = 1 - A_1 \quad \text{(Formula 3); and}$$

$$T_2 = 1 - R_2 \quad \text{(Formula 4).}$$

Figure 5:
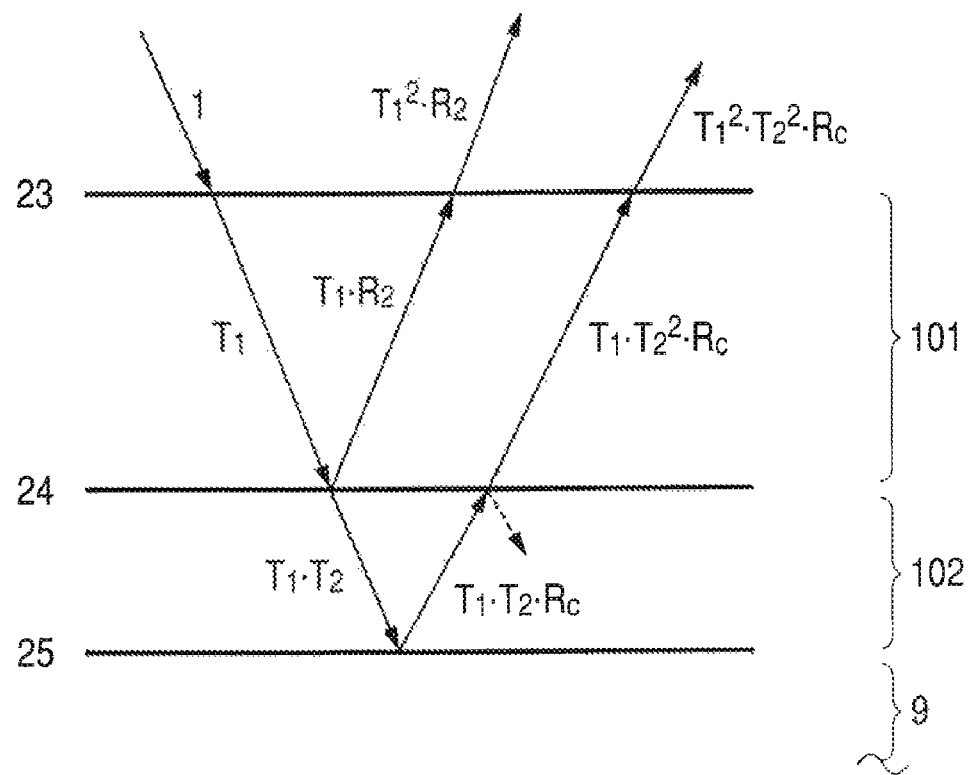
FIG. 5 is a schematic diagram illustrating the principle of display in a reflection type display apparatus according to an embodiment of the present invention.

Next, as illustrated in FIG. 5, where the incident light intensity in the present apparatus is 1 and Rc is the reflectance of the reflector 9, the reflected light intensity I can be calculated according to Formula 5 below, ignoring multireflection (see FIG. 5):

$$I = T_1^2 \cdot R_2 + T_1^2 \cdot T_2^2 \cdot Rc = (1-A_1)^2 \cdot R_2 + (1-A_1)^2 \cdot (1-R_2)^2 \cdot Rc \quad \text{(Formula 5).}$$

The present apparatus can provide color display and black display and also provide white display with a high reflectance according to Formulae 1 to 5 above, which will be described in turn below.

First, where a particular color, for example, red is displayed, the first light modulating layer 11 and the second light modulating layer 12 over the reflector 17, which reflects light in the wavelength band for red, are both made to enter a light transmitting state, i.e., $T_1 = T_2 = 0$. Also, the first light modulating layers 13 and 15 over the reflectors 18 and 19, which reflect light in wavelength bands for blue and green, respectively, are made to enter a light absorbing state. The second light modulating layers 14 and 16 may be in either a light reflecting state or a light transmitting state. Table 1 indicates the values for the reflectors where Rc=0.33.

Table 1 is a table indicating the absorptances $A_1$ of the first light modulating layers 11, 13 and 15, the reflectances $R_2$ of the second light modulating layers 12, 14 and 16 and the reflected light intensities I calculated according to Formula 5, for each of the pixels having the red, green and blue reflectors 17, 18 and 19 when red is displayed.

TABLE 1

| | | | |
|---|---|---|---|
| Absorptance $A_1$ | 0 | 1 | 1 |
| Reflectance $R_2$ | 0 | — | — |
| Reflected light intensity 1 | 0.33 | 0 | 0 |
| Reflector | Red (17) | Green (18) | Blue (19) |

In this case, incident light penetrates the light modulating layers 11 and 12 over the reflector 17, which reflects light in the wavelength band for red, and the red color is reflected by the reflector 17. The light modulating layers 13 and 15 absorb the incident light, neither reflecting nor transmitting the incident light, and accordingly the blue and green pixels turn to be of black. As a result, only the red color is reflected, thereby red being displayed.

Similarly, Table 2 indicates the states of the light modulating layers when white is displayed. Table 2 indicates the absorptances $A_1$ of the first light modulating layers 11, 13 and 15, the reflectances $R_2$ of the second light modulating layers 12, 14 and 16, and the reflected light intensities I calculated according to Formula 5 when white is displayed.

TABLE 2

| | | | |
|---|---|---|---|
| Absorptance $A_1$ | 0 | 0 | 0 |
| Reflectance $R_2$ | 1 | 1 | 1 |
| Reflected light intensity 1 | 1 | 1 | 1 |
| Reflector | Red (17) | Green (18) | Blue (19) |

In this case, when white is displayed, the whole incident light is reflected by the light modulating layers, resulting in white display. In other words, according to the present embodiment, when white is displayed, the whole incident light is reflected without being absorbed by a color filter or the other components, enabling to display white with a high reflectance.

Similarly, Table 3 indicates an arrangement when black is expressed. Table 3 indicates the absorptances $A_1$ of the first light modulating layers 11, 13 and 15, the reflectances $R_2$ of the second light modulating layers 12, 14 and 16, and the reflected light intensities I calculated according to Formula 5 when black is displayed.

TABLE 3

| Absorptance $A_1$ | 1 | 1 | 1 |
|---|---|---|---|
| Reflectance $R_2$ | — | — | — |
| Reflected light intensity 1 | 0 | 0 | 0 |
| Reflector | Red (17) | Green (18) | Blue (19) |

Also, a gradation from white to black can be displayed. A white color with a reflectance of $n^2$ (0<n<1), i.e., a grey color can be expressed by a modulation according to Table 4. Table 4 indicates the absorptances $A_1$ of the first light modulating layers 11, 13 and 15, the reflectances $R_2$ of the second light modulating layers 12, 14 and 16, and the reflected light intensities I calculated according to Formula 5 when a color between white and black with a reflectance of $n^2$ is displayed.

TABLE 4

| Absorptance $A_1$ | 1 − n | 1 − n | 1 − n |
|---|---|---|---|
| Reflectance $R_2$ | 1 | 1 | 1 |
| Reflected light intensity 1 | $n^2$ | $n^2$ | $n^2$ |
| Reflector | Red (17) | Green (18) | Blue (19) |

Also, as opposed to Table 4, a grey color can be expressed even where $R_2$ is not 1. Table 5 relates to display of a grey color with a reflectance of $n^2 \times 0.33$ obtained according to Formula 5. Table 5 indicates the absorptances $A_1$ of the first light modulating layers 11, 13 and 15, the reflectances $R_2$ of the second light modulating layers 12, 14 and 16, and the reflected light intensities I calculated according to Formula 5 when a color between white and black with a reflectance of $n^2 \times 0.33$ is displayed.

TABLE 5

| Absorptance $A_1$ | 1 − n | 1 − n | 1 − n |
|---|---|---|---|
| Reflectance $R_2$ | 0 | 0 | 0 |
| Reflected light intensity 1 | $n^2 \times 0.33$ | $n^2 \times 0.33$ | $n^2 \times 0.33$ |
| Reflector | Red (17) | Green (18) | Blue (19) |

Furthermore, a gradation of a particular color can be expressed. For example, a red color with a reflectance of $n^2 \times 0.33$ is expressed, a modulation is conducted according to Table 6. Table 6 relates to display of a red color with a reflectance of $n^2 \times 0.33$ obtained according to Formula 5. Table 6 indicates the absorptances $A_1$ of the first light modulating layers 11, 13 and 15, the reflectances $R_2$ of the second light modulating layers 12, 14 and 16, and the reflected light intensities I calculated according to Formula 5 when a red color with a reflectance of $n^2 \times 0.33$ is displayed.

TABLE 6

| Absorptance $A_1$ | 1 − n | 1 | 1 |
|---|---|---|---|
| Reflectance $R_2$ | 0 | 0 | 0 |
| Reflected light intensity 1 | $n^2 \times 0.33$ | 0 | 0 |
| Reflector | Red (17) | Green (18) | Blue (19) |

With the combination of the aforementioned arrangements, color display can be provided while high reflectance display being provided when white is displayed. The above combination is a mere example, and the preset invention is not necessarily limited to this combination, and various kinds of other combinations may be employed.

For the first light modulating layer 101, an electrochromic layer may be used, other than a layer using electroplating formed on the transparent electrode. In this case, the electrochromic layer may be prepared according to the method described in U.S. Pat. No. 5,831,760, for example.

Also, for the second light modulating layer 102, an electrochromic layer may be used, other than a layer using electroplating formed on the transparent electrode. The electrochromic layer may be prepared according to, for example, the method described in AIST Today 2003. 3, Vol. 3, No. 3, published by Advanced Industrial Science and Technology.

Next, specific examples of the present invention will be described.

Example 1

Figure 6:
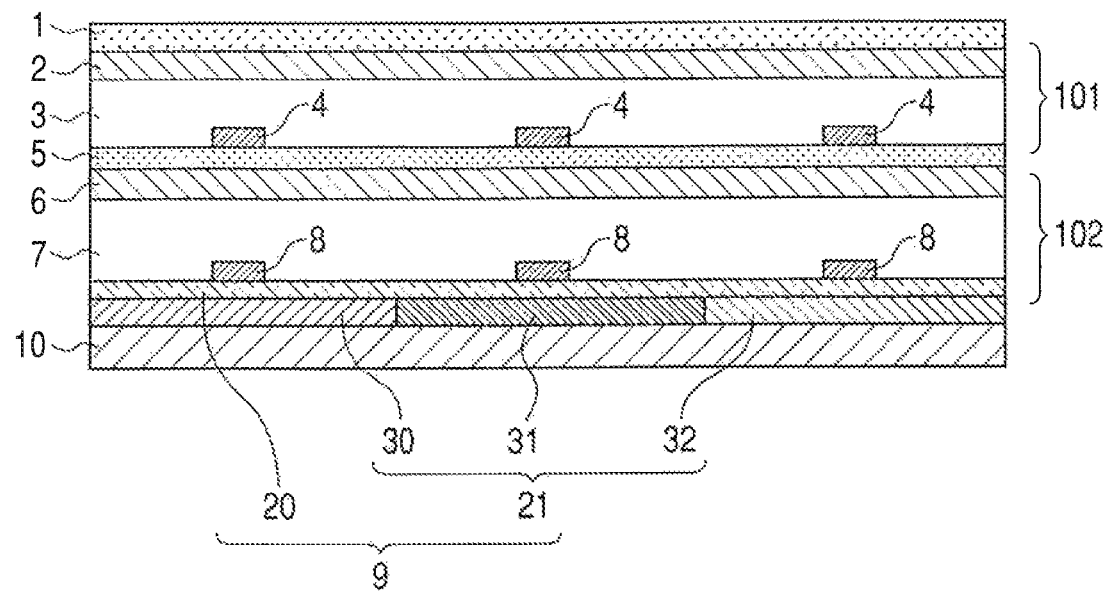
FIG. 6 is a cross-sectional view of a configuration of a reflection type display apparatus according to Example 1 of the present invention.

The specific structure of a reflection type display apparatus according to the present example will be described with reference to FIG. 6. The pixel size of the present apparatus was 0.7 mm×0.7 mm.

(First to Third Supporting Substrates)

For the first supporting substrate 1, a glass plate having a thickness of 0.7 mm was used. For the second supporting substrate 5, a glass plate having a thickness of 0.1 mm was used. For the third supporting substrate 10, a silicon wafer was used.

(First Light Modulating Layer)

For the first electrode 2, an ITO (Indium-Tin-Oxide) film, which is formed by means of sputtering, was used. For the first electrolytic solution 3, a solution containing 200 g/L of nickel sulfate, 5% of ammonia, 20% of zinc chloride, and water. The thickness of the first electrolytic solution 3 was 0.1 mm. For the first counter electrodes 4, platinum wires with a width of 0.1 mm and a thickness of 3 μm was used.

(Second Light Modulating Layer)

For the second electrode 6, an ITO film, which is formed by means of sputtering, was used. For the second electrolytic solution 7, a solution containing 30 g/L of silver, 500 g/L of potassium iodide, 5 g/L of methansulfonic acid, and water was used. The thickness of the second electrolytic solution 7 was 0.1 mm. For the second counter electrodes 8, platinum wires with a width of 0.1 mm and a thickness of 3 μm was used.

(Reflector)

For the reflector 9, a plate obtained by depositing a glass plate 20 with a thickness of 0.1 mm and colored paper 21 in this order was used. Incident light is reflected by the colored paper 21. The colored paper 21 and the electrolytic solution 7 were separated by the glass plate 20 so that they were not in direct contact with each other. For the colored paper 21, first colored paper 30 colored in red, second colored paper 31 colored in blue, and colored paper 32 colored in green were used.

In the aforementioned configuration, when a voltage of 2 V using the first electrode 2 as a cathode was applied between the first electrode 2 and the first counter electrodes 4 of the first light modulating layer 101, current of 10 mA/cm² flowed, and on the surface of the first electrode 2, black electroplating containing Ni—Zn was formed. The electroplating became thicker in proportion to the current application time, and the absorptance was increased. A prefect light blocking effect was obtained in ten seconds.

Also, when a voltage of 1.4 V using the second electrode 6 as a cathode was applied between the second electrode 6 and the second counter electrodes 8 of the second light modulating layer 102, current of 40 mA/cm² flowed, and on the second electrode 6, electroplating having a silver mirror surface was formed. The electroplating became thicker in proportion to the current application time, and the reflectance was increased. The electroplating became a perfect reflective film in 30 seconds. When the direction of the current was reversed, the electroplating is dissolved again into the electrolytic solution.

In the present example, for the transparent first supporting substrate 1, which protects the front surface, and the second supporting substrate 5, glass plates were used, but other transparent solids including resins can be used.

Also, in the present example, for the first electrode 2 and the second electrode 6, ITO was used to form transparent electrodes, IZO (Indium-Zinc-Oxide), zinc oxide, titanium oxide and other transparent conductive substances can be used. Furthermore, metal thin films, metal network structures and comb structures can be used if they are substantially transparent.

Also, for the first electrolytic solution 3, for example, a commercially-available nickel-zinc alloy plating solution can used as an electrolytic solution that deposits light absorbing electroplating, but the first electrolytic solution 3 is not limited to this solution.

Also, for the second electrolytic solution 7, an electrolytic solution that can deposit light reflecting electroplating can be used, for example, a commercially-available silver plating solution or rhodium plating solution can be used, but the second electrolytic solution 7 is not limited to these solutions.

Furthermore, for the first counter electrodes 4 and the second counter electrodes 8, any conductive material of the same kind as that of the respective electroplating deposited or any stable conductive material that does not change as a result of the electroplating reaction, such as carbon and gold, other than platinum can be used. Other transparent materials such as ITO can also be used.

The reflector 9 is of a material that selectively reflects a particular color, and may have a laminated structure formed by placing a reflector under a color filter that transmits the particular color, or may also be a single-layer colored reflector.

The third supporting substrate 10 is not limited to a silicon wafer, and a wide range of solids can be used if they have an adequate strength, and also, the third supporting substrate 10 can be omitted if the glass plate 20 or the colored paper 21 has a sufficient strength.

Example 2

In the present example, the reflector in the display apparatus according to Example 1 was provided with components for three colors, i.e., red, green and blue, arranged in a matrix in the Bayer pattern to form a reflection type display apparatus that can provide color display. For the reflector, a laminate of the aforementioned glass plate and colored paper was used. The red, green and blue components arranged in the Bayer pattern, which conform to the pixel size, were printed using a color printer. The pixels were driven by a passive matrix driving method. This display apparatus enabled display of all colors including white and black.

The color arrangement for the reflector is not limited to the Bayer pattern. The colors are also not limited to the aforementioned ones, and the combination of cyan, magenta and yellow may also be employed. The coloring method is also not limited to a printer. Furthermore, driving can be conducted by means of an active matrix driving method using transistors.

Example 3

Figure 7:
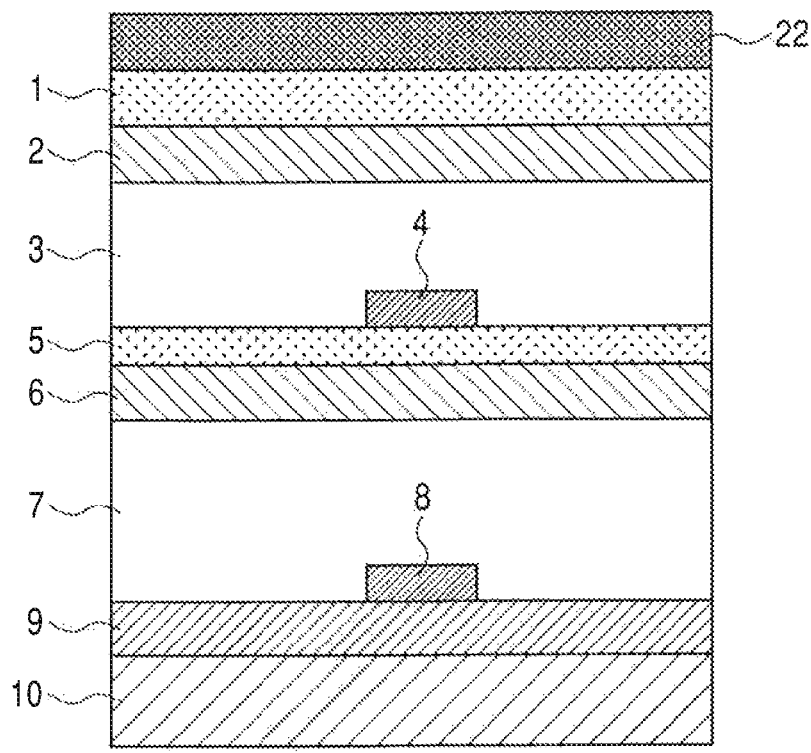
FIG. 7 is a cross-sectional view of a configuration of a reflection type display apparatus according to Example 2 of the present invention.

The display apparatus according to Example 1 displays white in a light reflecting state. As a result, the display exhibits a poor scattering property, which is different from whiteness on paper, and is more like whiteness on a mirror. For displaying white in a manner closer to whiteness on paper, in the present example, as illustrated in FIG. 7, the frontmost surface of the apparatus according to Example 1 was provided with a scattering sheet 22. As a result, the white display had a texture close to that of paper by means of the scattering sheet 22.

The position where the scattering sheet 22 is arranged is not limited to the frontmost surface, and the scattering sheet 22 may be arranged at any position that is closer to the front surface than the "light reflecting electroplating" formed by electroplating, i.e., any position that is closer to the light incidence side than the second light modulating layer 102 in which a light reflecting state and a light transmitting state can be controlled externally and electrically.

Also, for the apparatus structure, it is only necessary to have a layer having a scattering effect at a position closer to the front surface than the second electrode 6. Also, the material is not limited to the scattering sheet 22, and another member may double as one providing the scattering function. For example, the scattering function may be obtained by using a scattering plate for the first supporting substrate 1, using a scattering plate for the second supporting substrate 5, or using a whitish liquid for the first electrolytic solution 3.

Example 4

Figure 8:
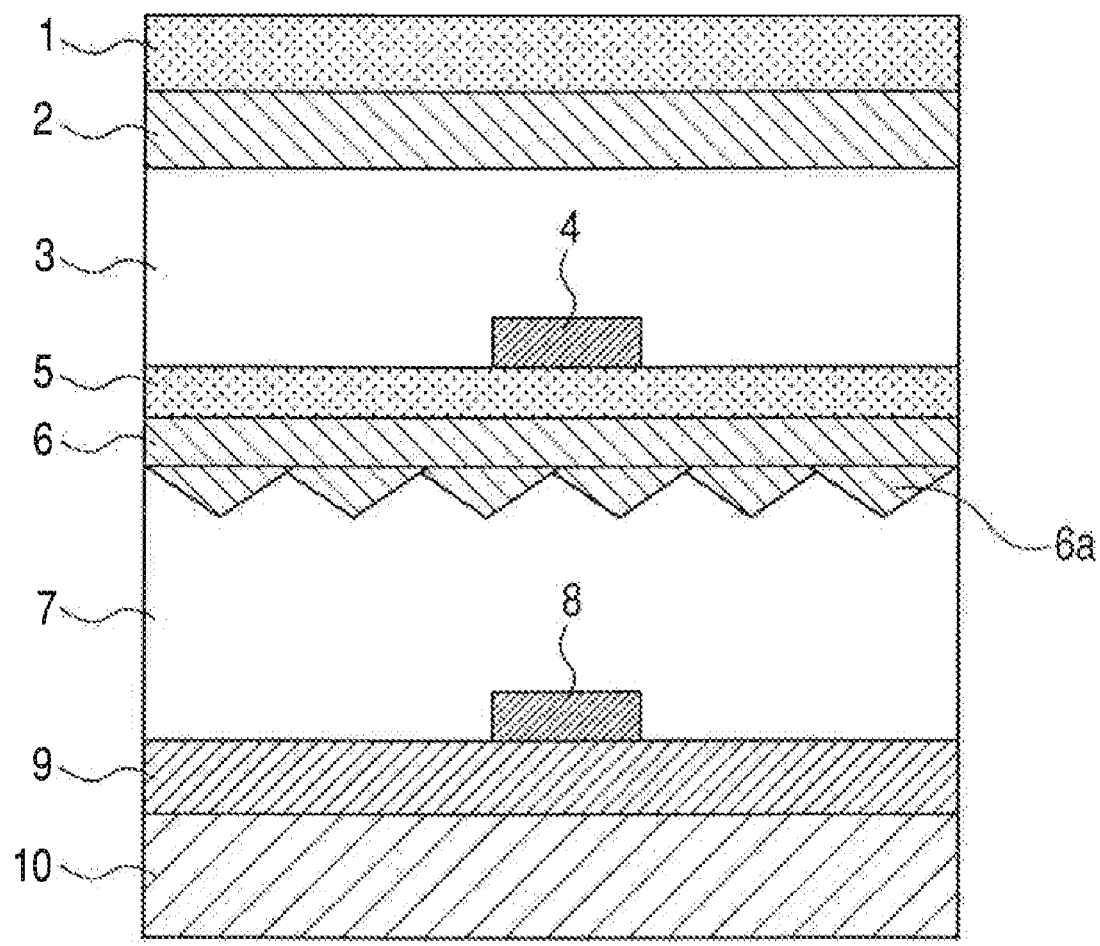
FIG. 8 is a cross-sectional view of a configuration of a reflection type display apparatus according to Example 3 of the present invention.

The scattering effect in Example 3, as illustrated in FIG. 8, was also obtained by forming a minute concave and convex pattern (concave and convex shape) 6a with a pitch of 0.05 mm on a side surface of the second electrode 6, which was formed of ITO, in the second light modulating layer 102, by means of a photolithographic process and wet etching. When light reflecting electroplating deposits on the second electrode 6 having the concave and convex pattern 6a, light diffuses by means of the concave and convex pattern 6a, enabling good white display close to whiteness on paper.

Also, the concave and convex pattern 6a only needs to have a light scattering function, and it should be understood that the pitch size, arrangement, electrode material, etc., for the concave and convex pattern 6a are not limited to those in the aforementioned example.

Example 5

In the present example, multilayered dielectric films configured to reflect light in particular wavelength bands was used as the reflector 9 in Example 1. Good selective reflection can be provided as a result of each multilayered dielectric film being formed by depositing films with a film thickness that meets $n \cdot d = \lambda/4$ (n is refractive index, and d is film thickness) relative to a wavelength to be reflected $\lambda$ and with different refractive indexes. As an example of the multilayered dielectric film, in order to reflect blue light with a wavelength of 450 nm, a multilayered dielectric film obtained by alternately depositing silica layers with a thickness of 308 nm (refractive index: 1.46) and titania layers with a thickness of 180 nm (refractive index: 2.5) to form three layers was used. Also, in order to reflect green light with a wavelength of 550 nm, a multilayered dielectric film obtained by depositing silica layers with a thickness of 377 nm and titania layers with a thickness of 220 nm to form three layers was used. Furthermore, in order to reflect red light with a wavelength of 700 nm, a multilayered dielectric film obtained by depositing silica layers with a thickness of 479 nm and titania layers with a thickness of 280 nm to form three layers was used.

In order to provide a particular pixel with desired reflection characteristics, photolithography and etching can be used. It should be understood that the materials and thicknesses of the multilayered dielectric films are not limited to those in the aforementioned example, and can be selected according to the relevant wavelength bands.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-187106, filed Jul. 18, 2007, which is hereby incorporated by reference herein in its entirety.

What is claimed is:

1. A reflection type display apparatus comprising:
a first light modulating layer for controlling electrically and externally a light absorbing state and a light transmitting state;
a second light modulating layer for controlling electrically and externally a light reflecting state and the light transmitting state; and
a reflector for reflecting light of a particular wavelength band, wherein
the first and second light modulating layers and the reflector are arranged in order from a light incidence side, and wherein
the first light modulating layer comprises a first electrode including a light transmitting property arranged at the light incidence side, and a first counter electrode disposed in opposition to the first electrode sandwiching a first electrolytic solution containing a first metal ion between the first electrode and the first counter electrode, for controlling the light absorbing state and the light transmitting state according to depositing of the first metal ion onto the first electrode and according to dissolving of the first metal ion into the first electrolytic solution, wherein
the second light modulating layer comprises a second electrode including a light transmitting property arranged at an opposite side of the first counter electrode to a light incidence side of the first counter electrode, and a second counter electrode disposed in opposition to the second electrode sandwiching a second electrolytic solution containing a second metal ion between the second electrode and the second counter electrode, for controlling the light reflection state and the light transmitting state according to depositing of the second metal ion onto the second electrode and according to dissolving of the second metal ion into the second electrolytic solution, and wherein
the reflector is arranged at a side of the second counter electrode opposite to a light incidence side of the second counter electrode.

2. The reflection type display apparatus according to claim 1, wherein an absorption ratio A1 of the first light modulating layer, and a reflection ratio R2 of the second light modulating layer are controlled such that, under a condition that an intensity of an incident light is normalized as being 1 and a reflection ratio of the reflector is set as being Rc, an intensity I of a reflected light meets a relation:

$$I=(1-A1)^2 \cdot R_2+(1-A_1)^2 \cdot (1-R_2)^2 \cdot R_c.$$

3. The reflection type display apparatus according to claim 1, further comprising a plurality of pixels arranged in a matrix, wherein each of the pixels comprises the first and second light modulating layers and the reflector.

4. The reflection type display apparatus according to claim 1, further comprising a light scattering layer arranged nearer to the light incidence side than the second light modulating layer.

5. The reflection type display apparatus according to claim 1, wherein the reflector comprises a first reflector for reflecting a red light, a second reflector for reflecting a green light, and a third reflector for reflecting a blue light.

6. The reflection type display apparatus according to claim 1, wherein the reflector comprises a multilayered dielectric film for reflecting the light of a particular wavelength band.

7. The reflection type display apparatus according to claim 1, wherein the reflector comprises a paper colored in a particular color.

8. The reflection type display apparatus according to claim 1, wherein the second electrode of the second light modulating layer has a concave and a convex shape for scattering light.

* * * * *